United States Patent
Chen et al.

(10) Patent No.: US 8,210,069 B2
(45) Date of Patent: Jul. 3, 2012

(54) WRIST STRUCTURE OF ROBOT ARM

(75) Inventors: Jan Hao Chen, Changhua County (TW);
En Sheng Chang, Taichung (TW);
Chun Chien Ting, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 283 days.

(21) Appl. No.: 12/684,270

(22) Filed: Jan. 8, 2010

(65) Prior Publication Data

US 2011/0120255 A1    May 26, 2011

(30) Foreign Application Priority Data

Nov. 20, 2009   (TW) ................................ 98139651 A

(51) Int. Cl.
*B25J 17/00* (2006.01)
*B25J 17/02* (2006.01)
*B25J 18/00* (2006.01)

(52) U.S. Cl. ............... 74/490.06; 74/490.01; 74/490.05; 901/29

(58) Field of Classification Search ............... 74/490.01, 74/490.03, 490.05, 490.06; 901/14, 15, 27, 901/28, 29; 384/903
See application file for complete search history.

(56) References Cited

U.S. PATENT DOCUMENTS

| | | | |
|---|---|---|---|
| 4,626,165 A | 12/1986 | Nakashima et al. | |
| 4,787,262 A | 11/1988 | Kozawa et al. | |
| 5,178,031 A | 1/1993 | Orsi et al. | |
| 5,231,889 A | 8/1993 | Lee et al. | |
| 5,462,369 A * | 10/1995 | Layne et al. | 384/538 |
| 5,549,016 A | 8/1996 | Nakako et al. | |
| 5,934,148 A | 8/1999 | Haniya et al. | |
| 6,389,921 B1 | 5/2002 | Nada | |
| 6,696,810 B2 | 2/2004 | Uematsu et al. | |
| 7,028,578 B2 | 4/2006 | Uematsu et al. | |
| 7,069,808 B2 | 7/2006 | Uematsu et al. | |
| 2009/0114054 A1 * | 5/2009 | Horiuchi et al. | 74/490.05 |
| 2011/0048157 A1 * | 3/2011 | Long et al. | 74/490.03 |

FOREIGN PATENT DOCUMENTS

| | | |
|---|---|---|
| CN | 201020718 Y | 2/2008 |
| JP | 4313481 A | 11/1992 |
| TW | 315783 | 9/1997 |
| TW | 200639028 A | 11/2006 |

* cited by examiner

*Primary Examiner* — Justin Krause
(74) *Attorney, Agent, or Firm* — Morris Manning & Martin LLP; Tim Tingkang Xia, Esq.

(57) ABSTRACT

A wrist structure of a robot arm includes a forearm body, a first rotating assembly, a wrist body, and a second rotating assembly. The first rotating assembly is disposed in the forearm body and drives the wrist body to rotate with respect to the forearm body in a first rotation axis direction. The second rotating assembly is disposed in the wrist body and drives a workpiece to rotate with respect to the wrist body in a second rotation axis direction. The first rotating assembly has a first speed reducer directly connected to the wrist body, so as to directly drive the wrist body at a predetermined speed reduction ratio, thereby obtaining a predetermined torque.

8 Claims, 6 Drawing Sheets

WRIST STRUCTURE OF ROBOT ARM

CROSS-REFERENCE TO RELATED APPLICATIONS

This non-provisional application claims priority under 35 U.S.C. §119(a) on Patent Application Ser. No(s). 09/813, 9651 filed in Taiwan, R.O.C. on Nov. 20, 2009, the entire contents of which are hereby incorporated by reference.

BACKGROUND OF THE INVENTION

1. Field of Invention

The present invention relates to a robot arm structure, and more particularly to a wrist structure of a robot arm.

2. Related Art

The robot or robot arm has been widely applied in various different fields such as production and manufacturing, warehouse management, and intelligent nursing. The robot or robot arm is usually formed by a structure with a plurality of support arms connected together. The pivoting motion of each support arm is controlled by driving joints connecting the support arms.

Generally, a joint-type industrial robot has six rotation shafts, among which four rotation shafts serve as the rotation shafts of the robot arm for achieving the wide-angle movement in a large range, and the other two rotation shafts are wrists of the robot arm for achieving positioning and orienting functions such as gripping and extracting. For example, U.S. Pat. No. 5,178,031 has disclosed a wrist for an industrial robot, in which the wrist part is only supported by a single side, and the rotation movement of the wrist may be influenced if the load is excessively heavy, and furthermore, the rotating motor at the wrist is exposed outside and cannot be operated in a dangerous environment (such as an oil gas or an aqueous gas).

In addition, for example, U.S. Pat. No. 7,028,578 has disclosed a wrist driving mechanism for a robot, in which three rotation shafts respectively drive a gear train by a drive motor and then the gear train further drives a speed reducer for performing transmission. However, in U.S. Pat. No. 7,028,578, a plurality of bearings and a plurality of gear elements are taken as a transmission interface. As a result, the assembling process is difficult and the cost is high.

Furthermore, for example, U.S. Pat. No. 5,231,889 has disclosed a wrist unit for an industrial robot, in which the wrist is located between two side holes of an arm, two bearings are inserted into through holes on both sides, the outer side of the arm is fixed through suppress caps, and the rotation shaft of the motor on the right side is connected to the rotation shaft of the wrist through a belt. In U.S. Pat. No. 5,231,889, the motor on the right side is directly fixed to the inner side of the arm, and the rotation shaft of the wrist is fixedly soldered to the wrist, so that the relative distance between the motor on the right side and the rotation shaft of the wrist is constant. However, the motor on the right side drives the rotation shaft of the wrist through a belt. The belt has its service life, and when the belt is in fatigue, the motions of the wrist cannot be positioned any more. Thus, such inaccurate positioning problem cannot be solved unless a new belt is used to replace the old one. Furthermore, all common robot arms need to be provided with a speed reducer, and the speed reducer reduces the revolution number output by the motor to a desired revolution number, so as to obtain a relative large torque. In U.S. Pat. No. 5,231,889, the motor on the right side needs to be configured with a speed reducer. However, the rotation shaft of the wrist is directly fixed to the wrist by soldering, and then the bearings are taken as an interface for reducing frictions. That is to say, in the design of the wrist unit disclosed in U.S. Pat. No. 5,231,889, no suitable location is provided for mounting the speed reducer. If an additional mechanism is further provided for mounting the speed reducer, the robot arm definitely has a more complicated structure, and necessary parts and components are further increased, thereby resulting in the increased cost. Furthermore, if an additional mechanism is further provided for transmitting the output of the speed reducer to the wrist, the wrist may fail to obtain the predetermined torque due to the transmission loss caused by the additional mechanism, and as a result, the motions of the wrist cannot be performed accurately.

SUMMARY OF THE INVENTION

The robot arm of a conventional joint-type industrial robot has a complicated mechanical structure and is formed by a lot of parts and components, so that the assembling process is rather tough and time-consuming, thereby resulting in the increased cost of production and maintenance. In view of the above, the present invention is a wrist structure of a robot arm, in which a speed reducer directly drives a wrist.

The present invention provides a wrist structure of a robot arm, which comprises a forearm body, a first rotating assembly, a wrist body, and a second rotating assembly. The first rotating assembly is disposed in the forearm body and drives the wrist body to rotate with respect to the forearm body in a first rotation axis direction. The second rotating assembly is disposed in the wrist body and drives a workpiece to rotate with respect to the wrist body in a second rotation axis direction.

The first rotating assembly comprises a first motor, a fixing base, a transmission mechanism, a first speed reducer, and a bearing mechanism. The first motor is mounted in the forearm body through the fixing base, and adjusts a relative position of the fixing base by using an adjusting base. The first motor outputs a rotating power to the first speed reducer through the transmission mechanism. The first speed reducer is directly fixed on one side of the forearm body, so that the axial and radial movement freedom of the first speed reducer is restricted. An output shaft of the first speed reducer is directly fixed to the wrist body, so as to directly drive the wrist body with a predetermined speed reduction ratio, thereby obtaining a predetermined torque.

The second rotating assembly comprises a second motor, a connection base, and a second speed reducer. The second motor is mounted in the wrist body, and the connection base is connected to the second motor and the second speed reducer, such that the second motor is enclosed in the wrist body, so as to be protected.

Based on the wrist structure of the robot arm in the present invention, the relative positions between the first motor and the forearm body can be adjusted through the fixing base and the adjusting base, so as to obtain the optimum rotating power output through the transmission mechanism. The first speed reducer is directly fixed to the wrist body, so as to obtain a predetermined torque output. Thus, the wrist structure of the robot arm in the present invention is an optimum design for the wrist structure of the robot arm.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1A:
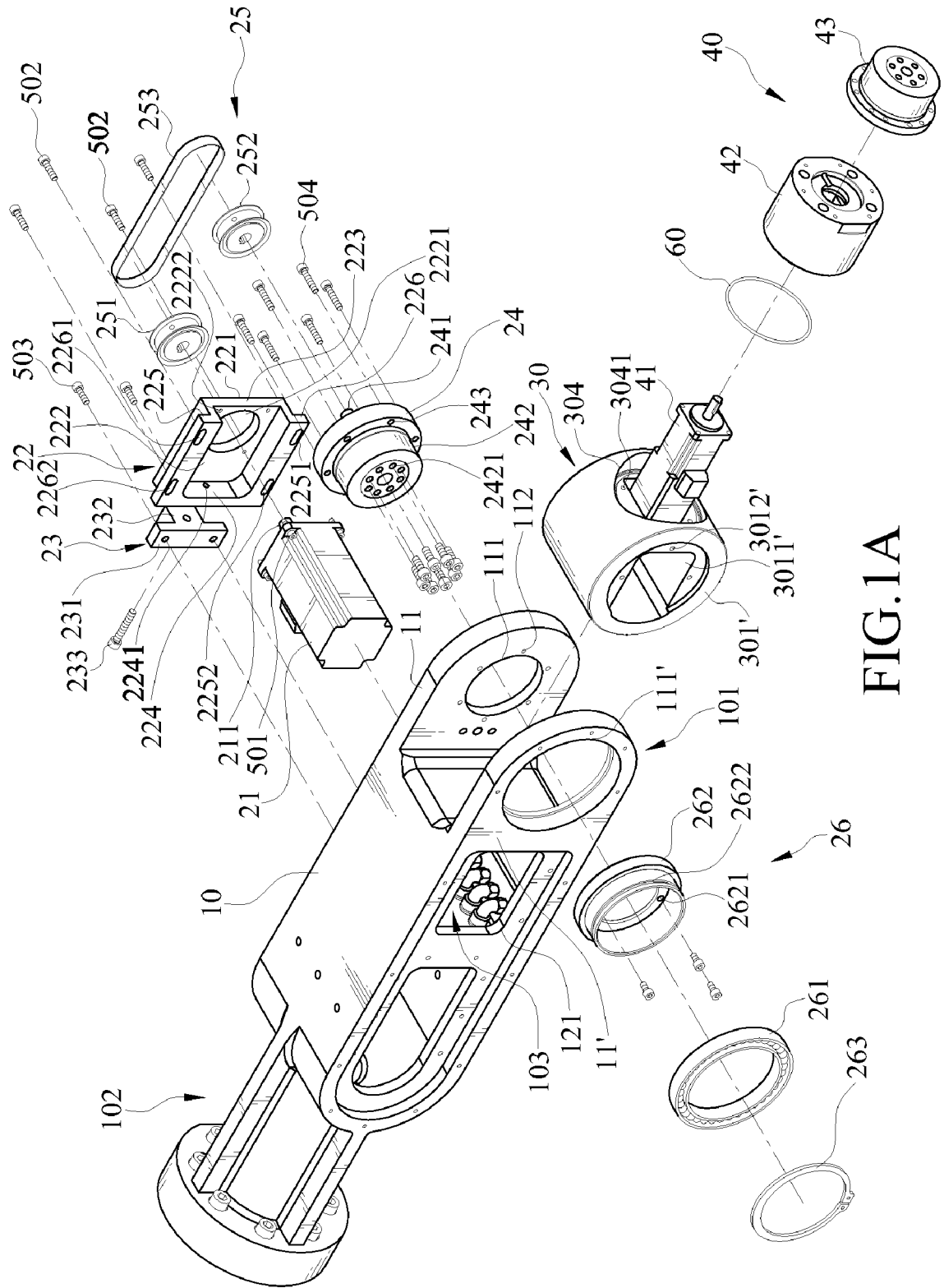
FIGS. 1A and 1B are schematic exploded views of a structure of the present invention.
Figure 1B:
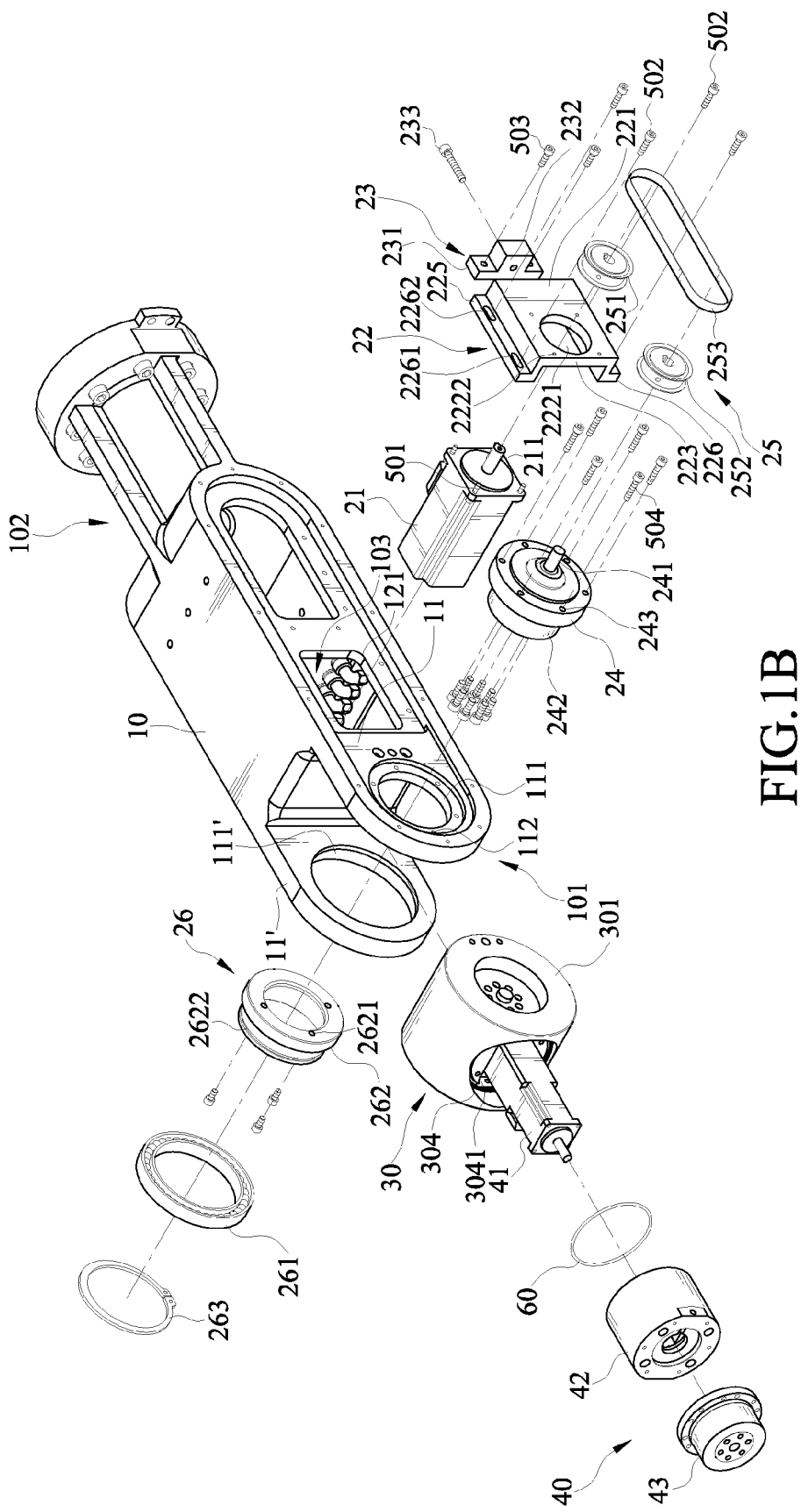

According to the wrist structure of the robot arm in the present invention, the robot arm is used for simulating actions of the human's arm, and is formed by a structure with a plurality of support arms connected together, and the robot arm is controlled through controlling the pivoting motions of each support arm. The robot arm for simulating the human's arm similarly comprises a shoulder, an upper arm, a fore arm, a wrist, a hand, and fingers. In the following specific embodiments, a connection relation between the fore arm and the wrist is taken as a preferred embodiment of the present invention. However, the technical features of the present invention are not limited to the connection relation between the fore arm and the wrist.

Referring to FIGS. 1A, 1B, 2A, and 2B, the wrist structure of the robot arm in the present invention comprises a forearm body 10, a first rotating assembly 20, a wrist body 30, and a second rotating assembly 40.

The forearm body 10 is substantially a long-cuboid-shaped hollow body, in which one end is a wrist connecting end 101 and the other end is an upper arm connecting end 102. The long-cuboid-shaped hollow body has a chamber 103 therein. Two opposite wrist-connecting parts 11 and 11' are provided at the wrist connecting end 101, and each of the wrist-connecting parts 11 and 11' is opened with a first counter bore 111 and a second counter bore 111'. A plurality of screw holes 112 is disposed in the circumference of the first counter bore 111 and the second counter bore 111'. Furthermore, openings 12 and 12' are respectively disposed in two side walls of the forearm body 10 corresponding to the first counter bore 111 and the second counter bore 111', and a plurality of screw holes 121 is disposed in the circumference of the opening 12.

The first rotating assembly 20 comprises a first motor 21, a fixing base 22, an adjusting base 23, a first speed reducer 24, a transmission mechanism 25, and a bearing mechanism 26.

The first motor 21 is used for providing a rotating power and has an output shaft 211. The first motor 21 is mounted to the forearm body 10 through the fixing base 22. The fixing base 22 is substantially U-shaped, and comprises a front wall 221, two side walls 222 and 223, and a bottom wall 224. Wing parts 225 and 226 respectively extend from the end edges of the side walls 222 and 223. The front wall 221 has a round opening 2221, and a plurality of screw holes 2222 is disposed in the circumference of the round opening 2221. The first motor 21 is mounted and fixed on the fixing base 22 by locking a plurality of screws 501 into the screw holes 2222. The output shaft 211 of the first motor 21 extends out of the round opening 2221. A plurality of long guide slots 2251, 2252, 2261, and 2262 is disposed in the two wing parts 225 and 226 of the fixing base. Corresponding to the opening 12 of the forearm body 10, the fixing base 22 is disposed in the chamber 103 of the forearm body 10 through the first motor 21 by means of locking a plurality of screws 502 into the screw holes 121 in the circumference of the opening 12 after enabling the screws 502 to pass through the long guide slots 2251, 2252, 2261, and 2262. The fixing base 22 is enabled to move up and down with respect to the forearm body 10 due to the configurations of the long guide slots 2251, 2252, 2261, and 2262 and the screws 502. Furthermore, a screw hole 2241 is opened in the bottom wall 224 of the fixing base 22.

The adjusting base 23 is substantially T-shaped, and comprises a bottom part 231 and a top part 232, in which the bottom part 231 is disposed with a plurality of screw holes 2311, and the top part 232 is disposed with an adjusting hole 2321. The adjusting base 23 is disposed under the fixing base 22 and spaced apart by a gap, and the bottom part 231 of the adjusting base 23 is mounted to the side wall of the forearm body 10, and a plurality of screws 503 is locked into the screw holes 112 in the side wall of the forearm body 10 from the screw holes 2311 of the bottom part 231. An adjusting bolt 233 is screwed into the screw hole 2241 of the fixing base 22 via the adjusting hole 2321 of the adjusting base 23, and the adjusting bolt 233 may be rotated to drive the fixing base 22 to move up and down.

The first speed reducer 24 comprises an input shaft 241 and an output shaft 242. A plurality of screw holes 243 is opened in the circumference of the first speed reducer 24, and a plurality of screw holes 2421 is disposed in the output shaft 242. The first speed reducer 24 is mounted in the first counter bore 111 of the forearm body 10. The first speed reducer 24 is directly fixed on the forearm body 10 by locking a plurality of screws 504 into the screw holes 112 of the forearm body 10 after enabling the screws 504 to pass through the screw holes 243 of the first speed reducer 24.

The transmission mechanism 25 comprises a first belt pulley 251, a second belt pulley 252, and a belt 253. The first belt pulley 251 is mounted on the output shaft 211 of the first motor 21, the second belt pulley 252 is mounted on the input shaft 241 of the first speed reducer 24, and the belt 253 is sleeved on the first belt pulley 251 and the second belt pulley 252, so as to transmit the rotating power of the first motor 21 to the first speed reducer 24. In addition, the adjusting bolt 233 is rotated to drive the fixing base 22 to move up and down, so as to adjust a relative distance between the first belt pulley 251 and the second belt pulley 252, and then the belt 253 is adjusted to a state with an optimum tightness, thereby transmitting the power.

The bearing mechanism 26 comprises a bearing 261, a connecting ring 262, and a snap ring 263. The bearing 261, the connecting ring 262, and the snap ring 263 are all hollow ring-shaped bodies. The bearing 261 is mounted in the second counter bore 111' of the forearm body 10. The connecting ring 262 is inserted into the bearing 261, and comprises a plurality of screw holes 2621 therein. The connecting ring 262 further comprises a catching groove 2622. The snap ring 263 is fastened into the catching groove 2622, so that the connecting ring 262 is rotatably disposed in the second counter bore 111' of the forearm body 10.

The wrist body 30 is substantially a cylinder-shaped hollow body, and has two end surfaces, that is, a first round end surface 301 and a second round end surface 301'. The cylinder-shaped hollow body has a chamber 303 therein. The first round end surface 301 has a plurality of screw holes 3011. The second round end surface 301' is opened with an opening 3011', and a plurality of screw holes 3012' is disposed in the circumference of the opening 3011'. In addition, the wrist body 30 has an opening 304 disposed in the circumferential surface thereof, and a plurality of screw holes 3041 is disposed in the circumference of the opening 304.

Figure 2A:
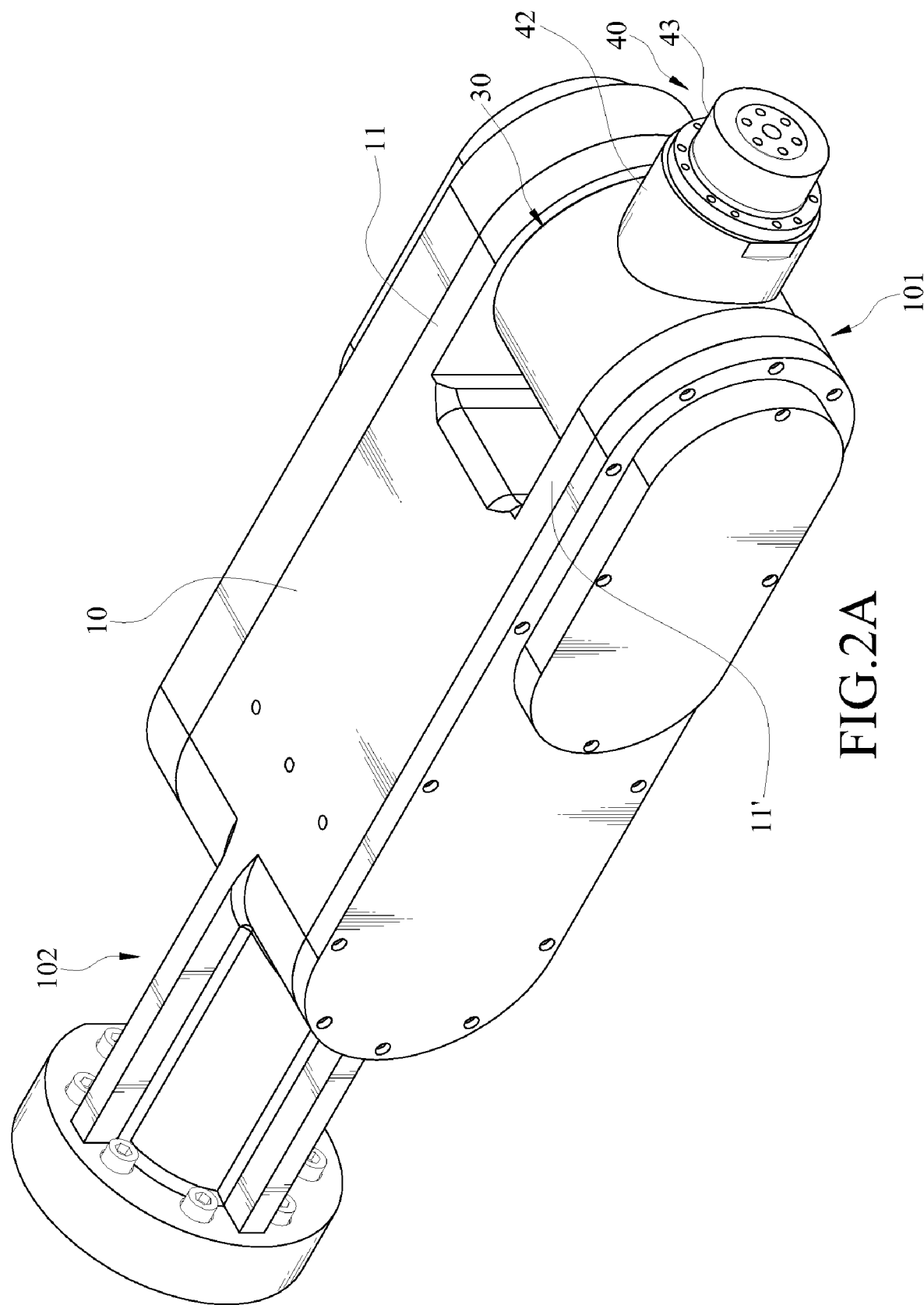
FIG. 2A is a schematic combined view of the structure of the present invention.
Figure 2B:
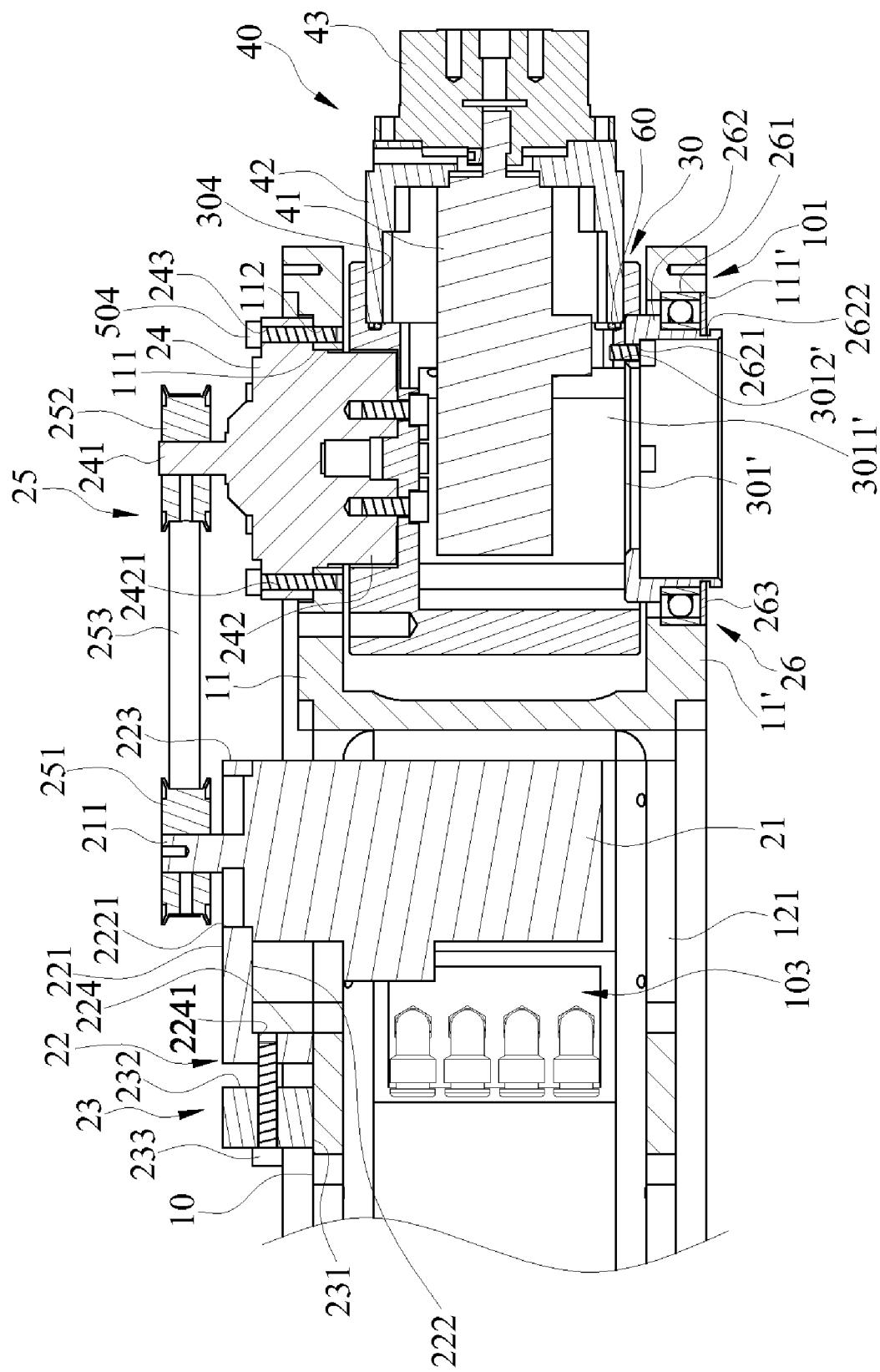
FIG. 2B is a schematic cross-sectional view of the structure of the present invention.

Referring to FIGS. 2A and 2B, the wrist body 30 is mounted between the wrist-connecting parts 11 and 11' of the forearm body 10. A plurality of screws 505 is locked into the screw holes 2421 of the output shaft 242 of the first speed reducer 24 from the screw holes 3011 of the wrist body 30, so that the output shaft 242 of the first speed reducer 24 is enabled to drive the wrist body 30 to rotate. A plurality of screws 506 passes through the screw holes 2621 of the connecting ring 262 and is locked into the screw holes 3012' of the second round end surface 301'. One end of the wrist body 30 is driven by the first speed reducer 24 to rotate, and the other end is connected to the bearing mechanism 26, so that the wrist body 30 is rotatably pivoted to the forearm body 10. The rotation shaft of the wrist body 30 on the forearm body 10 is defined as a first rotation axis direction X. In addition, the chamber 303 and the opening 304 of the wrist body 30, the second counter bore 111' of the forearm body 10, the bearing mechanism 26 of the first rotating assembly 20, and the opening 12' of the forearm body 10 constitute a wiring path.

The second rotating assembly 40 comprises a second motor 41, a connection base 42, and a second speed reducer 43. The second rotating assembly 40 is mounted at the opening 304 of the wrist body 30. The second motor 41 is used for providing a rotating power and comprises an output shaft 411. The second motor 41 is mounted in the chamber 303 of the wrist body 30. The connection base 42 is used to connect the second motor 41 and the second speed reducer 43 and has a plurality of screw holes 421. A plurality of screws 507 passes through the screw holes 421 and is locked into the screw holes 3041 of the wrist body 30, so that the second rotating assembly 40 is combined to the wrist body 30. A sealing ring 60 is disposed between the connection base 42 and the wrist body 30 for blocking water and oil gas, so as to protect the second motor 41. The rotating power of the second motor 41 is transmitted to the second speed reducer 43, a workpiece (not shown) may be mounted in the second speed reducer 43, and the rotation shaft of the second speed reducer 43 is defined as a second rotation axis direction Y. The connecting wire (not shown) of the second rotating assembly 40 may be connected back to the forearm body 10 via the wiring path.

Figure 3A:
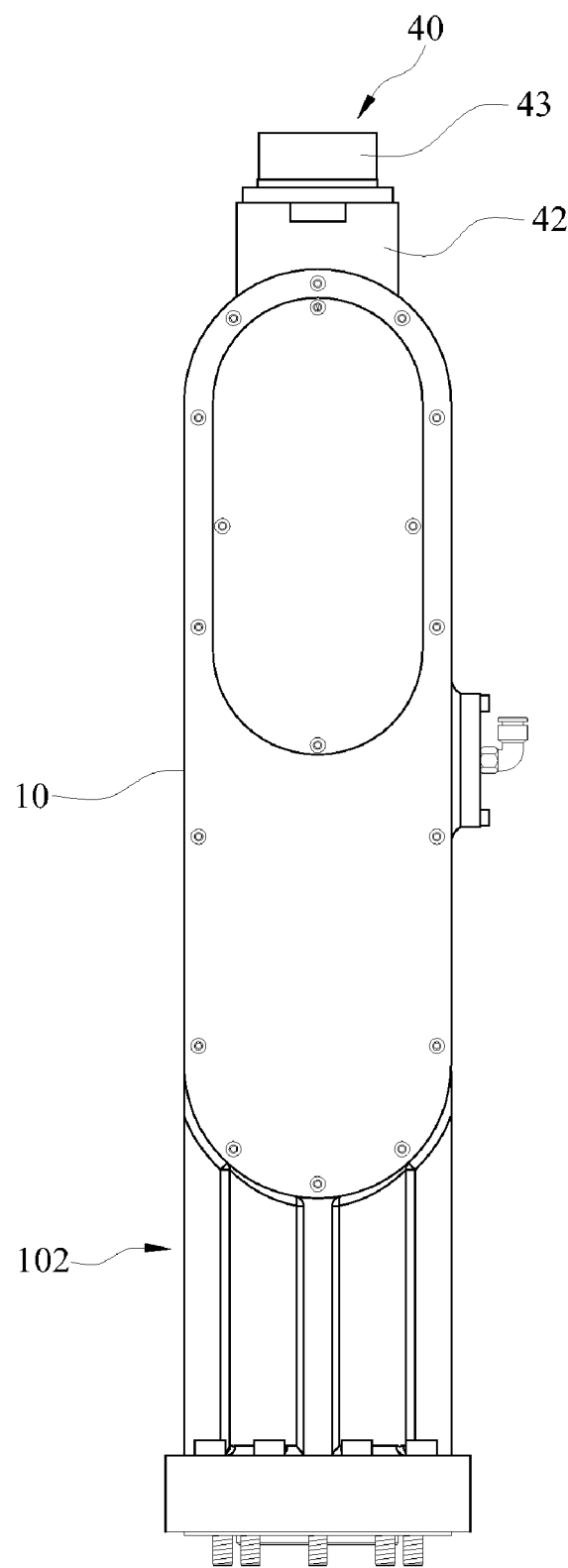
FIGS. 3A and 3B are schematic views of an application of the present invention.
Figure 3B:
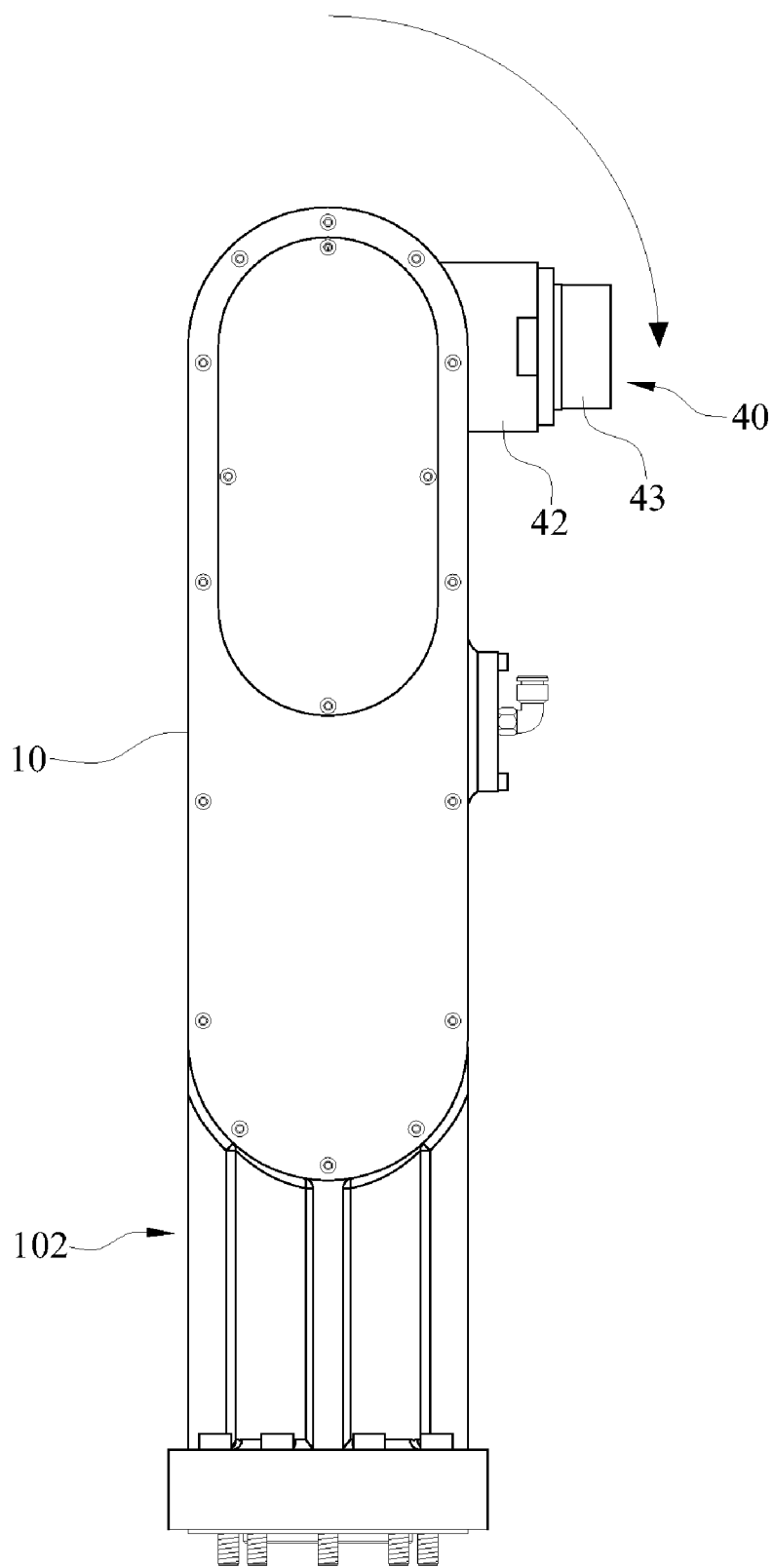

Referring to FIGS. 3A and 3B, according to the wrist structure of the robot arm in the present invention, the wrist body 30 is rotatably mounted to the forearm body 10 by the first rotating assembly 20, and the wrist body 30 rotates with respect to the forearm body 10 in the first rotation axis direction X. The relative positions may be adjusted by using the fixing base 22 and the adjusting base 23 to adjust the belt 253 to a state with an optimum tightness, so as to transmit the power. The first speed reducer 24 is directly connected to the wrist body 30 to drive the wrist body 30 to rotate. That is, the wrist body is directly driven at a predetermined speed reduction ratio, thereby obtaining a predetermined torque.

Furthermore, the first rotation axis direction X and the second rotation axis direction Y are orthogonal to each other, which is similar to the motion relationship between the forearm and the wrist. The second motor 41 of the second rotating assembly 40 is enclosed in the chamber 303 of the wrist body 30, and can be operated in a dangerous environment (such as an aqueous gas or an oil gas).

What is claimed is:

1. A wrist structure of a robot arm, comprising:
   a forearm body, having two opposite wrist-connecting parts, wherein the two opposite wrist-connecting parts comprises a first counter bore and a second counter bore, respectively;
   a wrist body, mounted between the wrist-connecting parts of the forearm body, wherein the wrist body has a first round end surface and a second round end surface corresponding to the counter bores; and
   a first rotating assembly, mounted in the forearm body and connected to the wrist body, so that the wrist body rotates with respect to the forearm body in a first rotation axis direction, wherein the first rotating assembly comprises:
   a fixing base, movably mounted in the forearm body;
   a first motor, mounted in the fixing base and providing a rotating power;
   a first speed reducer, mounted in the first counter bore and directly connected to the first round end surface of the wrist body;
   a transmission mechanism, connected to the first motor and the first speed reducer, and driving the first speed reducer to rotate, so as to further drive the wrist body to rotate in the first rotation axis direction;
   a bearing mechanism, mounted in the second counter bore and connected to the second round end surface of the wrist body; and
   an adjusting base having an adjusting bolt, wherein the adjusting bolt is screwed into the fixing base to adjust a distance between the fixing base and the first speed reducer.

2. The wrist structure of the robot arm according to claim 1, wherein the forearm body comprises a chamber for accommodating the first motor.

3. The wrist structure of the robot arm according to claim 1, wherein the transmission mechanism comprises a first belt pulley, a second belt pulley, and a belt, the first belt pulley is disposed on the first motor, the second belt pulley is disposed on the first speed reducer, and the belt is sleeved on the first belt pulley and the second belt pulley.

4. The wrist structure of the robot arm according to claim 1, wherein the bearing mechanism comprises a bearing, a connecting ring, and a snap ring.

5. The wrist structure of the robot arm according to claim 1, further comprising a second rotating assembly mounted in the wrist body.

6. The wrist structure of the robot arm according to claim 5, wherein the second rotating assembly comprises a second motor, a connection base, and a second speed reducer, the connection base is connected to the second motor and the second speed reducer and mounted in the wrist body, a rotating power output by the second motor is transmitted to the second speed reducer, and the second speed reducer rotates in a second rotation axis direction.

7. The wrist structure of the robot arm according to claim 6, wherein the second rotation axis direction and the first rotation axis direction are orthogonal to each other.

8. The wrist structure of the robot arm according to claim 6, wherein the wrist body comprises a chamber, and a sealing ring is disposed between the connection base and the wrist body.

* * * * *